April 17, 1956  J. B. PARSONS  2,741,985
PRESSURE RELIEF FOR FLUID PUMPS
Filed Jan. 14, 1953
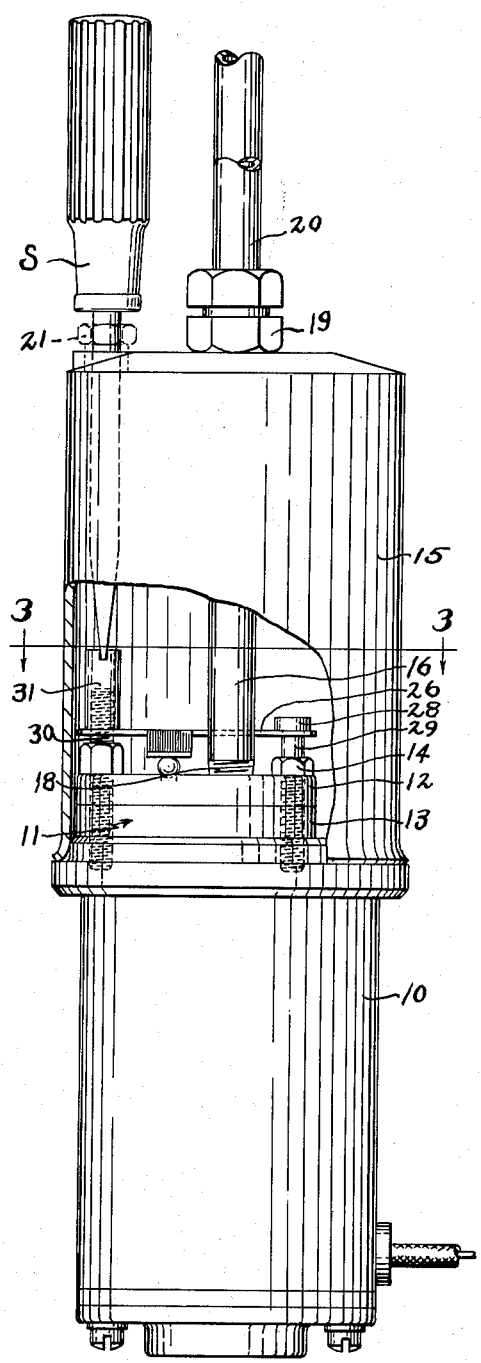
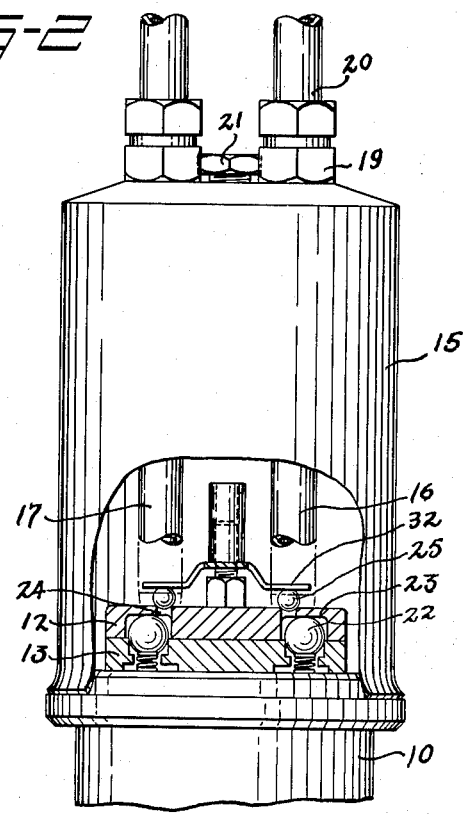
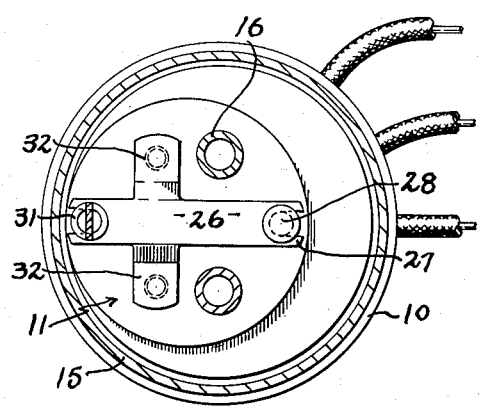
INVENTOR.
JOHN B. PARSONS
BY
ATTY.

ed by the pump, depending upon the direction of
rotation of the motor, is sufficient to unseat one or the
other of the spring-tensioned valves 22, and by thus seating a particular ball check, liquid will be forced into one
or the other of the vertical tubes 16 and 17, the other of
these tubes serving as a return conduit from the work to
enable such liquid then to return to the reservoir 15. It
will be understood that the reservoir 15 is filled with liquid,
such as oil, and that the pump 11 is disposed within such
liquid, thereby enabling the use of a less expensive housing since the problems of liquid seal are not of great
concern. Detail description and illustration of the pump
is not considered necessary here. Reference, however,
is made to my application Serial No. 173,526, filed July
13, 1950, and entitled "Motor and Pump Assembly"
(now Patent 2,622,529 and dated December 23, 1952),
wherein a full and complete description of the structure
and operation of the pump are set forth.

United States Patent Office 2,741,985
Patented Apr. 17, 1956

2,741,985

PRESSURE RELIEF FOR FLUID PUMPS

John B. Parsons, Maumee, Ohio

Application January 14, 1953, Serial No. 331,149

1 Claim. (Cl. 103—2)

This invention relates to motor and pump units, but
particularly to those which include an electric motor, a
hydraulic pump and a reservoir for liquid handled by
the pump.

An object is to produce a new and improved pressure
relief device for a hydraulic pump which will not chatter;
can be inexpensively produced and installed; can be conveniently adjusted for the maximum pressure desired;
and is sturdy and reliable in operation.

Another object is to produce a pressure relief valve installation in a motor and pump assembly wherein the
hydraulic pump is arranged within the liquid reservoir
and the said installation is likewise arranged therein with
provision for regulating the relief pressure from the outside.

Further objects and advantages of the invention will
hereinafter appear, and for purposes of illustration but
not of limitation, an embodiment of the invention is
shown on the accompanying drawings, in which:

Figure 1 is a side elevation of a motor and pump assembly, part of the reservoir being broken away to show
the hydraulic pump and associated parts;

Figure 2 is a fragmentary side elevation of the assembly
with a portion of the reservoir broken away to show the
interior thereof, the hydraulic pump being shown in vertical section to illustrate the spring-tensioned ball valves;
and Figure 3 is a transverse sectional view on the line 3–3
of Figure 1.

The illustrated embodiment of the invention comprises
an electric motor unit 10, the upper end of which is closed by an end plate on which is mounted a hydraulic
pump 11 of the rotary gear type. The housing of the
pump is in two parts, 12 and 13, secured together by cap
screws 14. The screws 14 extend into the end plate of a
reversible electric motor 10, and holds the pump in the
desired position within an upright liquid reservoir 15
which is of inverted cup shape. The lower end of the
reservoir abuts against the motor end plate with an appropriate liquid-tight seal between the mouth of the reservoir and the end plate. Disposed within the reservoir
15 is a pair of vertical tubes 16 arranged in parallel relation, each having a screw-threaded lower end 18 for engagement with the upper pump housing section 12, these
tubes being aligned with the ports of the pump serving
as inlet and outlet of same. It will be observed that the
tubes 16 extend through the top wall of the cylindrical
reservoir 15 and suitable fittings 19 secure and seal the
tubes in place and also hold the reservoir in place. Leading from the fittings are tubes 20 for conducting liquid
under pressure to and from the work. A screw filler
plug 21 is disposed in the top wall of the cylinder 15 and
is arranged at one side to enable a screw driver S to be
inserted therethrough for a purpose hereinafter to be described.

Within the pump housing is a pair of normally open
spring-tensioned ball check valves 22 which control the
passages leading from the reservoir to the pump motor
respectively. It will be understood that hydraulic pressure generated The spring-tensioned ball check valves 22 are within
chambers 23 in the upper housing part 12, and leading
from each of these chambers is a passage 24 which opens
into the interior of the reservoir 15. It will be understood
that the check valves 22 control the flow of liquid from
the reservoir 15 to the respective chamber 24 and when
pressure is built up to force one of these balls to its seat,
then the liquid will flow into the adjacent vertical tube
instead of passing into the reservoir. On the other hand,
the other ball being open, enables liquid from the reservoir
or from the adjacent vertical tube to pass to the low
pressure side of the pump, as will be readily understood.

These passages 24 afford pressure relief passages and
each is controlled by a ball valve 25. As shown, each ball
valve 25 is considerably larger than the mouth of the
associated passage 24 and does not seat well within the
mouth. On the contrary, each valve 25 seats on the
mouth of such passage in such manner that the greater
portion of the ball is disposed outside of the mouth. Such
arrangement is found to be of importance in obviating
chattering of the balls when moved to and from seating
position. Is is found empirically that providing a ball
of considerably larger diameter than that of the passage
with which it is associated, objectionable chattering and
the noise incident thereto are obviated.

The ball relief valves 25 are normally held in seated
position by a cross shaped spring device which has a flat
elongate body 26 of spring metal, the ends of which are
notched as indicated at 27, one end embracing a smooth
shank 29, which provides an extension of one of the cap
screws 14 and has a head 28. The other notched end of
the spring body 26 embraces a threaded shank 30 which
provides an integral extension of the other cap screw, as
shown in Figure 1, and screwed on to this extension is an
internally threaded sleeve 31, the upper end of which is
notched to receive a screw driver.

Integral with the body 26 is a pair of oppositely extending spring arms 32 arranged on the body somewhat
closer to the screw-threaded shank 30. Each arm 32
inclines downwardly and outwardly from the body 26
and terminates in a flat portion parallel to the plane of
the body 26. Each flat portion of the arms 32 engages
the top of one of the ball valves 25, imposing a spring
pressure thereagainst to hold the same in seated position.
When the hydraulic pressure within one of the chambers
23 is sufficiently great to overcome the pressure exerted
by the respective spring arm 32 upon the respective ball
valve 25, the latter is lifted from its seat to enable the
pressure to be relieved, excess oil passing into the reservoir.
As soon as the pressure is relieved, then the ball 25 automatically returns to its seat.

The pressure exerted by the spring arms 32 may be controlled by adjustment of the sleeve 31. Thus by screwing the sleeve 31 downwardly to force the end of the body 26 downwardly, a greater pressure is imposed upon the balls 25 in a uniform manner, and by unscrewing the sleeve 31, the pressure on the balls 25 is reduced. The filler opening which is closed by the screw plug 21 is so arranged as to be directly above the sleeve 31 so that by removing the filler plug, 21, a screw driver S may be inserted therethrough to engage the notch of the sleeve 31 for adjusting it in the desired manner, thus obviating the necessity of removing the reservoir cylinder to effect this adjustment. Adjustment can be readily and quickly effected while the pump is operating.

From the description, it will be manifest that I have produced an exceedingly simple and inexpensive pressure relief device which can be conveniently and inexpensively mounted. Adjustment can be effected by merely removing the filler plug and inserting a screw driver. Although ordinarily it is regarded that ball valves are not suitable for this purpose, because of objectionable chattering when moved to and from their seats, however, by employing balls considerably larger than their seats, this objection is overcome. This is probably due to the fact that the ball has relatively short movement to become unseated and permit the passage of liquid than would be the case where the ball seated substantially within the passage which it controls. In any event, the result has been exceedingly satisfactory and the pressure relief is achieved noiselessly and efficiently.

It is to be understood that numerous changes in details of construction, arrangement and operation may be effected without departing from the spirit of the invention especially as defined in the appended claim.

What I claim is:

A motor and pump assembly comprising a reversible electric motor, a cup-shaped sheet metal reservoir in end to end abutting relation to said motor with the open end of the reservoir facing the motor, a pump unit arranged wholly within said reservoir and operatively connected to be driven by said motor, said pump unit including a housing having a pair of valve controlled passages communicating with the interior of the reservoir, ball pressure relief valves associated with said passages respectively for relieving excessive pressure within the housing leaf spring means for normally holding said relief valves seated comprising a cross-shaped leaf spring, means to anchor opposite ends of the body of the spring, the cross arms of the spring engaging the ball valves respectively, means accessible through the reservoir for adjusting the tension imposed by the spring, tube means extending from the pump through the reservoir with end portions projecting through openings in the closed end of the reservoir, and means engaging said projecting tube end portions for securing the reservoir to the motor.

References Cited in the file of this patent

UNITED STATES PATENTS

| | | |
|---|---|---|
| 1,173,703 | Benkert | Feb. 29, 1916 |
| 1,352,123 | Green | Sept. 7, 1920 |
| 1,416,695 | Dennedy | May 23, 1922 |
| 1,416,696 | Dennedy | May 23, 1922 |
| 1,780,121 | Dunning | Oct. 28, 1930 |
| 2,032,885 | Murphy | Mar. 3, 1936 |
| 2,202,912 | Johnson | June 4, 1940 |
| 2,246,610 | Wagner | June 24, 1941 |
| 2,268,695 | Carlson | Jan. 6, 1942 |
| 2,393,406 | Parsons | Jan. 22, 1946 |
| 2,405,466 | Tabb | Aug. 6, 1946 |